Oct. 13, 1959   J. W. MARX   2,908,819
APPARATUS FOR MEASURING PROPERTIES OF GASES
Filed June 13, 1955

INVENTOR.
J.W. MARX

BY *Hudson & Young*

ATTORNEYS

United States Patent Office 2,908,819
Patented Oct. 13, 1959

2,908,819

APPARATUS FOR MEASURING PROPERTIES OF GASES

John W. Marx, Bartlesville, Okla., assignor to Phillips Petroleum Company, a corporation of Delaware Application June 13, 1955, Serial No. 515,088

12 Claims. (Cl. 250—43.5)

This invention relates to apparatus for measuring properties of gases by the radiation absorption characteristics thereof.

In various fields of measurement and control there is a need for apparatus capable of measuring such properties of gases as pressure, density, molecular weight and the compressibility factor. Measurements of these properties can form the basis for analytical and control procedures.

The present invention is directed toward providing apparatus which is capable of measuring the above-mentioned properties of gases by their radiation absorption properties. Penetrating radiation, preferably alpha or beta particles, is directed through a gas sample and the transmitted radiation is measured. For a given source of radiation, the transmission is an inverse function of the product of the density and mean molecular weight of the gas. This is evident because the product of these quantities is a measure of the number of gas molecules present, and the greater the number of molecules, the greater is the radiation absorption. The apparatus of this invention comprises, generally, a chamber adapted to contain the gas sample. A source of radiation is disposed in the chamber and a collecting electrode is mounted in spaced relationship therewith. An electrical circuit is completed between the electrode and source and a current indicating instrument is included therein. The charged particles (alpha or beta particles) complete a circuit between the source and electrode by passage therebetween. In the preferred embodiment of this invention the source is in the form of a cylindrical rod and the collecting electrode is in the form of a pair of surrounding cones joined at their bases. This particular configuration provides paths of various lengths between the source and electrode to accommodate various gas pressures. The double cones assure that all particles having sufficient range will strike the collecting electrode. This provides a maximum output signal. In another embodiment of this invention an independent voltage source is included in the circuit so that particles produced by collisions between the original radiated particles and gas molecules are attracted to the source or the electrode.

The mean alpha particle range $r_0$ in air at one atmosphere pressure, 15° C., is expressed by the equation:

$$r_0 = 0.318(E)^{3/2} \qquad (1)$$

where $r_0$ is in centimeters and $E$ is the alpha particle energy in million electron volts (mev). Considering polonium 210, for example, which emits alpha particles with an energy of 5.30 mev., equation 1 becomes:

$$r_0 = (0.318)(5.3)^{3/2} = 3.72 \text{ cm.} \qquad (2)$$

From this value of $r_0$, which corresponds to an air density $d_0$ of 0.001226 gm./cm.$^3$, the range $r$ in any other gas or in air itself at a different density $d$ can be expressed by the equation:

$$r = \left(\frac{d_0}{d}\right)\left(\frac{M}{M_0}\right) r_0 \qquad (3)$$

where $M_0$ is the average molecular weight of air (taken to be 28.8) and $M$ is the average molecular weight of the gas under test. For polonium 210, equation 2 becomes:

$$r = \left(\frac{1.226 \times 10^{-3}}{2.88 \times 10}\right)(3.72)\left(\frac{M}{d}\right) = 1.58 \times 10^{-4} \frac{M}{d} \qquad (4)$$

Once the range $r$ is determined, the quantity $$\frac{M}{d}$$

can be calculated. If the average molecular weight of the gas under test is known, the density can be computed; and, conversely, if the density is known, the average molecular weight can be computed.

The density of a gas is directly related to its pressure by the equation:

$$\frac{M}{d} = \frac{ZRT}{P} \qquad (5)$$

where $Z$ is the compressibility factor, $T$ is the gas temperature, $P$ is the gas pressure, and $R$ is the universal gas constant. Thus, Equation 4 becomes:

$$r = (1.58 \times 10^{-4}) \frac{ZRT}{P} \text{ cm.} \qquad (6)$$

The compressibility factor for a perfect gas is unity. The values for real gases can be obtained from available engineering tables or by use of the apparatus of this invention.

From the foregoing equations it should be apparent that an instrument which effectively measures the mean range of alpha particles in a gas can be adapted for many uses. As previously mentioned, the average molecular weight or the density can be calculated if the other quantity is known, see Equation 3. If the compressibility factor and temperature are known, the pressure can be calculated from Equation 6. The gas compressibility factor can be calculated from Equation 6 if the pressure and temperature are known.

Accordingly, it is an object of this invention to provide apparatus to measure properties of gases in terms of the radiation absorption characteristics thereof.

Another object is to provide apparatus capable of determining the mean range of alpha and beta particles in gases.

Other objects, advantages and features of the invention should become apparent from the following detailed description, taken in conjunction with the accompanying drawing, in which.

Figure 1:
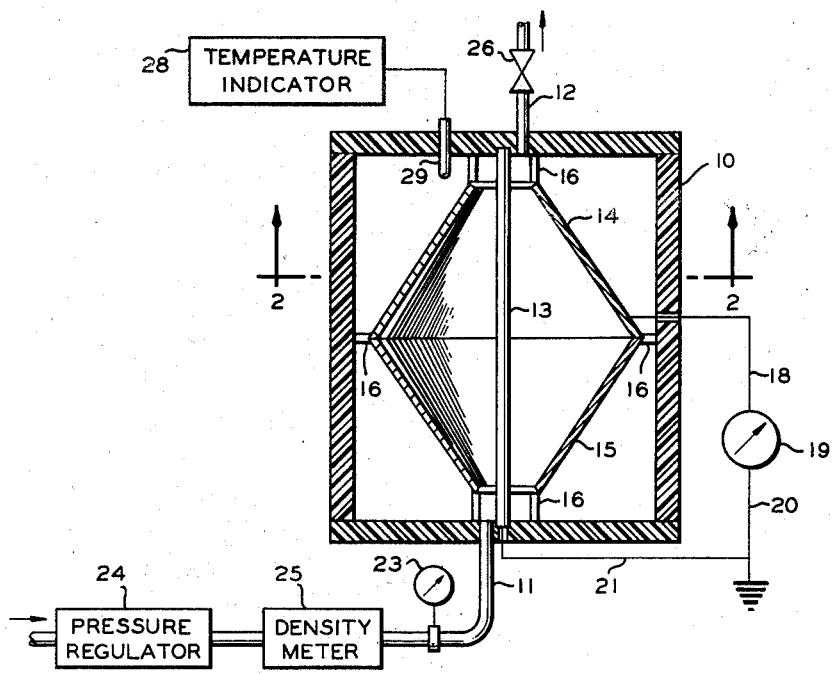
Figure 1 is a schematic view of a preferred embodiment of the apparatus of this invention.
Figure 2:
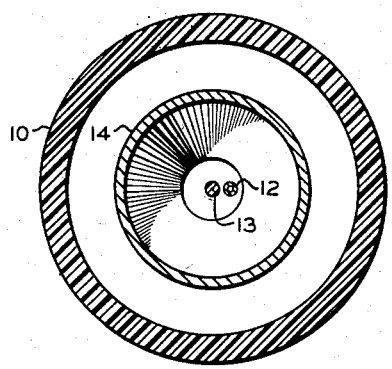
Figure 2 is a view taken along line 2—2 of Figure 1.

Referring now to the drawing in detail, and to Figures 1 and 2 in particular, there is shown a gas-tight chamber 10 having an inlet conduit 11 and an outlet conduit 12 connected thereto. A cylindrical rod 13 is mounted within chamber 10. This rod is formed of or is coated with a material which emits alpha or beta particles. A pair of hollow cones 14 and 15 of electrically conductive material is mounted within chamber 10 by supports 16 so that rod 13 is coaxial of the cones. An electrical lead 18 is connected between the cones and one terminal of a current indicating device 19. A lead 20 is connected between the second terminal of device 19 and ground. A lead 21 is connected between rod 13 and ground. Chamber 10 is formed of an insulating material, or if formed of metal for added strength, insulating mounting brackets, not shown, are employed to separate cones 14 and 15 from the chamber.

Inlet conduit 11 can be provided with a pressure gauge 23, a pressure regulator 24 and a gas density measuring gauge 25, depending upon the particular measurements to be made. A valve 26 is contained in outlet conduit 12. A temperature indicator 28, having a sensing probe 29 associated therewith, is provided to measure the temperature in chamber 10.

Particles emitted from rod 13 pass through the gas in chamber 10 toward conical electrodes 14 and 15. Whenever a particle reaches one of the electrodes there is a transfer of charge from rod 13 to the electrode. This results in a current through the external circuit which is of magnitude proportional to the number of particles reaching electrodes 14 and 15 per unit time. This current is measured by device 19 which can be a sensitive current indicator such as a D'Arsonval galvanometer, a string galvanometer, or a sensitive microammeter. Device 19 can also be a charge measuring instrument such as an integrating coulometer, a quadrant electrometer, or a sensitive electronic voltmeter.

The cylindrical configuration of rod 13 and the conical configurations of electrodes 14 and 15 are desirable because substantially all of the radiation emitted from rod 13 reaches one of the electrodes if it is not absorbed by the gas in chamber 10. The reason for the conical electrodes is to provide a plurality of paths between rod 13 and the electrodes of various lengths. This permits the instrument to be used over a wide pressure range. At low pressures a large number of particles reach the electrodes. However, at high pressures fewer particles reach the electrodes. These are the particles with relatively short paths. Obviously, other configurations of radiation source and electrodes can be employed if desired. The electrode can be in the form of a sphere or ellipsoid. Alternatively, source 13 can be a cone and the electrode a surrounding cylinder. Still other configurations can be selected to provide particular sensitivity at various pressure ranges.

The following example represents suitable equipment dimensions for a polonium 210 alpha particle source, assuming a nearly perfect gas. Air at normal room temperatures and pressures generally between one and one hundred atmospheres is an example of such a gas. When the values $Z=1$, $R=82.05$, $T=80°$ F.$=300°$ K., and $P=1$ are substituted in Equation 6 there is obtained:

$$r_1 = (1.58 \times 10^{-4}) \frac{(1)(82.05)(300)}{(1)} = 3.7 \text{ cm.} \quad (7)$$

This represents the maximum particle range at the lower pressure limit. At a pressure of one hundred atmospheres Equation 6 becomes $$r_{100} = 0.037 \text{ cm.} \quad (8)$$

Thus, the bases of conical electrodes 14 and 15 are separated from cylinder 13 by 3.7 cm. and the apex ends of electrodes are separated from cylinder 13 by 0.037 cm. Rod 13 can be any convenient length, such as two inches, for example.

For gases at very high pressures it is difficult to space the elements as closely as needed for alpha particles. Under such conditions a source of beta particles can be employed to advantage because of the greater penetrating power of beta particles. Thallium 204 emits electrons at an energy of 0.775 mev. and has a half life of 2.7 years. It can be shown that the range of such particles is about 26.5 times as great as the range of the 5.30 mev. alpha particles previously described. This enables gases at higher pressures to be investigated with practical equipment dimensions.

In practice the instrument is calibrated using gases of known composition at known pressures. The uses of the instrument are numerous. The transmitted radiation is an inverse function of the product of the density and mean molecular weight. If either quantity of a test gas is known, the other can be calculated. If a gas sample is passed through chamber 10 at a constant pressure, changes in transmitted radiation are representative of changes in composition of the gas. The compressibility factor of a gas can readily be calculated if the pressure and temperature are known.

Figure 3:
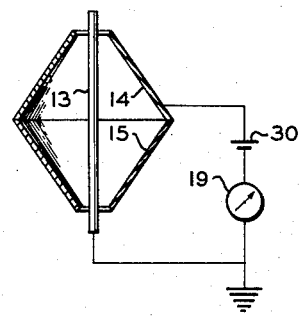
Figure 3 is a modified form of the apparatus of Figure 1.

In Figure 3 there is illustrated a modified form of the apparatus which has a potential source 30 connected in the measuring circuit. This arrangement is useful in studying a gas to determine the amount it is ionized by having radiation transmitted therethrough. Resulting ions are attracted to the electrodes 14 and 15 and measured by device 19. The polarity of voltage source 30 determines the polarity of charged particles attracted to the electrodes. The charged particles of opposite polarity are repelled toward source 13.

While polonium 210 has been described as an ideal source of alpha radiation, other sources can be used. These include, for example: uranium 238 and radium 224. Other suitable sources of beta radiation include: bismuth 210, strontium 90, and cobalt 60. Care must be taken when using radium 224 and cobalt 60 to avoid the personnel hazard of the accompanying gamma rays.

While the invention has been described in conjunction with present preferred embodiments, it obviously is not limited thereto.

What is claimed is:

1. Measuring apparatus comprising means defining a fluid-tight chamber, a first charged particle emitting electrode positioned in said chamber, a second electrode positioned in said chamber in spaced relationship with said first electrode, the configuration of said first and second electrodes being such that the distance therebetween varies from one end of said first electrode to the second end thereof, and means to measure the particles emitted from said first electrode which reach said second electrode.

2. The combination in accordance with claim 1 wherein said first electrode emits alpha particles.

3. The combination in accordance with claim 1 wherein said first electrode emits beta particles.

4. Measuring apparatus comprising means defining a fluid-tight chamber, a first charged particle emitting electrode positioned in said chamber, a second electrode positioned in said chamber in spaced relationship with said first electrode so as to substantially enclose said first electrode, the configuration of said first and second electrodes being such that the distance therebetween varies from one end of said first electrode to the second end thereof, and means to measure the particles emitted from said first electrode which reach said second electrode.

5. The combination in accordance with claim 4 wherein said first electrode comprises a cylindrical rod and said second electrode comprises a pair of hollow conical sections positioned base-to-base on a common axis, the axis of said rod being coaxial of said common axis.

6. Measuring apparatus comprising a cylindrical first electrode constructed at least in part of a material which emits charged particles, a pair of hollow conical sections of electrically conductive material positioned base-to-base so that the common axis thereof is coaxial of the axis of said first electrode, said sections being spaced from said first electrode, and current indicating means connected between said first electrode and said sections.

7. The combination in accordance with claim 6 further comprising a voltage source connected between said first electrode and said sections.

8. The combination in accordance with claim 1 further comprising means to measure the density of gas in said chamber.

9. The combination in accordance with claim 1 further comprising means to measure the temperature of gas in said chamber.

10. The combination in accordance with claim 1 further comprising a voltage source connected between said electrodes.

11. The combination in accordance with claim 1 further comprising means to introduce a gas into said chamber, and means to measure the pressure of the gas in said chamber.

12. The combination in acordance with claim 1 further comprising means to circulate a gas through said chamber at a predetermined pressure, means to measure the density of the gas circulated through said chamber, and means to measure the temperature of the gas circulated through said chamber.

References Cited in the file of this patent

UNITED STATES PATENTS

| | | |
|---|---|---|
| 2,555,116 | Coleman | May 29, 1951 |
| 2,594,777 | Hicks | Apr. 29, 1952 |
| 2,652,497 | Miller | Sept. 15, 1953 |
| 2,708,387 | Broida et al. | May 17, 1955 |
| 2,761,976 | Obermaier et al. | Sept. 4, 1956 |
| 2,765,409 | Hutchins et al. | Oct. 2, 1956 |

OTHER REFERENCES

Ser. No. 376,930, Peycelon et al. (A.P.C.), published May 25, 1943.